United States Patent [19]

Tseng

[11] Patent Number: 5,829,546
[45] Date of Patent: Nov. 3, 1998

[54] ELECTRICAL DRIVE FOR A BICYCLE

[75] Inventor: Diing-huang Tseng, Changhua Hsien, Taiwan

[73] Assignee: Merida Industry Co., Ltd., Changhua Hsien, Taiwan

[21] Appl. No.: 681,084

[22] Filed: Jul. 22, 1996

[51] Int. Cl.[6] .......................... B62K 11/00; B62M 23/02
[52] U.S. Cl. .......................... 180/206; 180/207; 180/220
[58] Field of Search .................................. 180/205–207, 180/220, 214, 65.2, 65.6

[56] References Cited

U.S. PATENT DOCUMENTS

| | | | |
|---|---|---|---|
| 4,026,375 | 5/1977 | Miura | 180/206 |
| 5,024,286 | 6/1991 | Lean et al. | 180/206 |
| 5,076,386 | 12/1991 | Ferneding | 180/207 |
| 5,474,148 | 12/1995 | Takata | 180/220 |

FOREIGN PATENT DOCUMENTS

| | | |
|---|---|---|
| 0612654 | 8/1994 | European Pat. Off. . |
| 0683093 | 11/1995 | European Pat. Off. . |
| 8908579 | 9/1989 | WIPO . |

*Primary Examiner*—Anne Marie Boehler
*Attorney, Agent, or Firm*—Jones, Day, Reavis & Pogue

[57] ABSTRACT

An electrical drive is provided for a bicycle including a crank axle having a first end portion and a second end portion. The electrical drive includes a housing mounted around the crank axle and having a first end portion and a second end portion located adjacent to the first and second end portions of the crank axle respectively. A drive shaft is mounted around the crank axle. A single direction bearing is fitted around the drive shaft. A torsional ring is mounted on the single direction bearing. A torsional rod is movably mounted around the second end portion of the crank axle and driven by the crank axle and is movably mounted in the torsional ring. A sensing race is fixedly mounted around the torsional rod. A sensing unit is mounted on the second end portion of the housing and is located adjacent to the sensing race for sensing a rotational velocity of the crank axle and a torsion exerted on the crank axle by means of the sensing race.

7 Claims, 7 Drawing Sheets

ELECTRICAL DRIVE FOR A BICYCLE

FIELD OF THE INVENTION

The present invention relates to an electrical drive, and more particularly to an electrical drive for a bicycle.

BACKGROUND OF THE INVENTION

A conventional electrical drive can output a determined amount of power supply to co-operate with physical peddaling of a rider so as to drive a bicycle synchronously, thereby providing a proper assistance for moving the bicycle. However, the conventional electric drive cannot precisely control power and voltages required for powering the bicycle, thereby easily causing a waste of power supply.

The present invention has arisen to mitigate and/or obviate disadvantages of the conventional electrical drive.

SUMMARY OF THE INVENTION

The primary objective of the present invention is to provide an electrical drive which can precisely control power required for driving a bicycle.

In accordance with one aspect of the present invention, there is provided an electrical drive for a bicycle which comprises a down tube, a pair of chain stays, a crank axle rotatably disposed between the down tube and the pair of chain stays and having a first end portion and a second end portion, and a chain wheel rotatably disposed on the first end portion of the crank axle.

The electrical drive comprises a housing mounted around the crank axle and having a first end portion and a second end portion. A chamber is defined in an inner wall of the housing. The crank axle is rotatably mounted in the chamber with the first end portion thereof extending outwards of the first end portion of the housing and the second end portion thereof extending outwards of the second end portion of the housing.

A drive shaft is rotatably mounted around the crank axle and has a first end portion located adjacent to the first end portion of the crank axle and a second end portion. The chain wheel is fixedly mounted around the first end portion of the drive shaft. At least one needle bearing is fitted between the crank axle and the drive shaft.

A first single direction bearing is fitted around the first end portion of the drive shaft. A beveled gear is mounted around the first single direction bearing. A driving mechanism is mounted on the housing for driving the beveled gear.

A second single direction bearing is fitted around the second end portion of the drive shaft. A torsional ring has a first end portion mounted on the second single direction bearing and a second end portion. A torsional rod is movably mounted around the second end portion of the crank axle and driven by the crank axle to rotate therewith and is movably mounted in the second end portion of the torsional ring.

A sensing race is fixedly mounted around the torsional rod. A sensing unit is mounted on the second end portion of the housing and is located adjacent to the sensing race for sensing a rotational velocity of the crank axle and a torsion exerted on the crank axle.

Further features of the present invention will become apparent from a careful reading of the detailed description provided hereinbelow, with appropriate reference to the accompanying drawings.

DETAILED DESCRIPTION OF THE PREFERRED EMBODIMENTS

Figure 1:
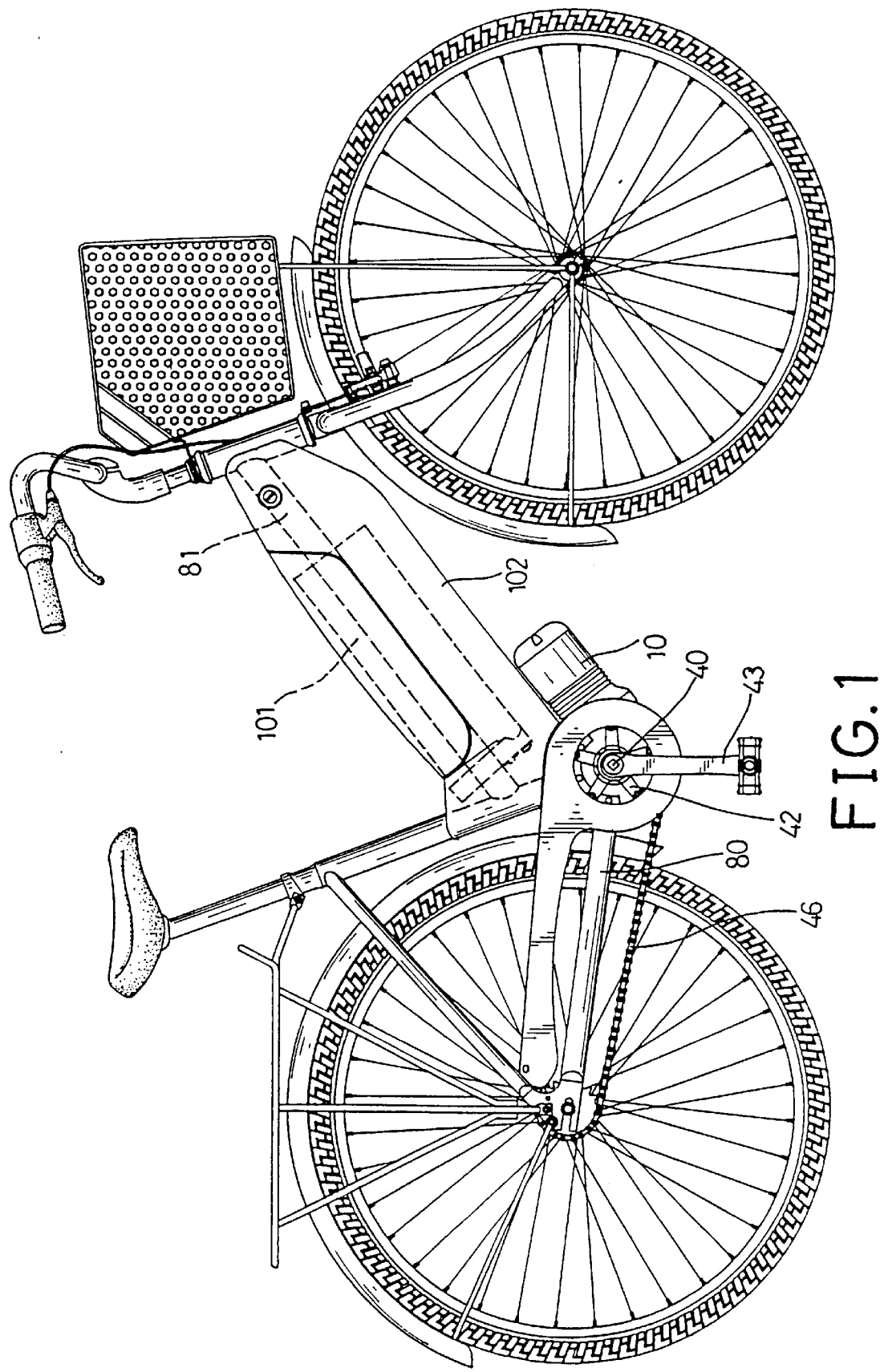
FIG. 1 is a front view of a bicycle in accordance with the present invention.
Figure 2:
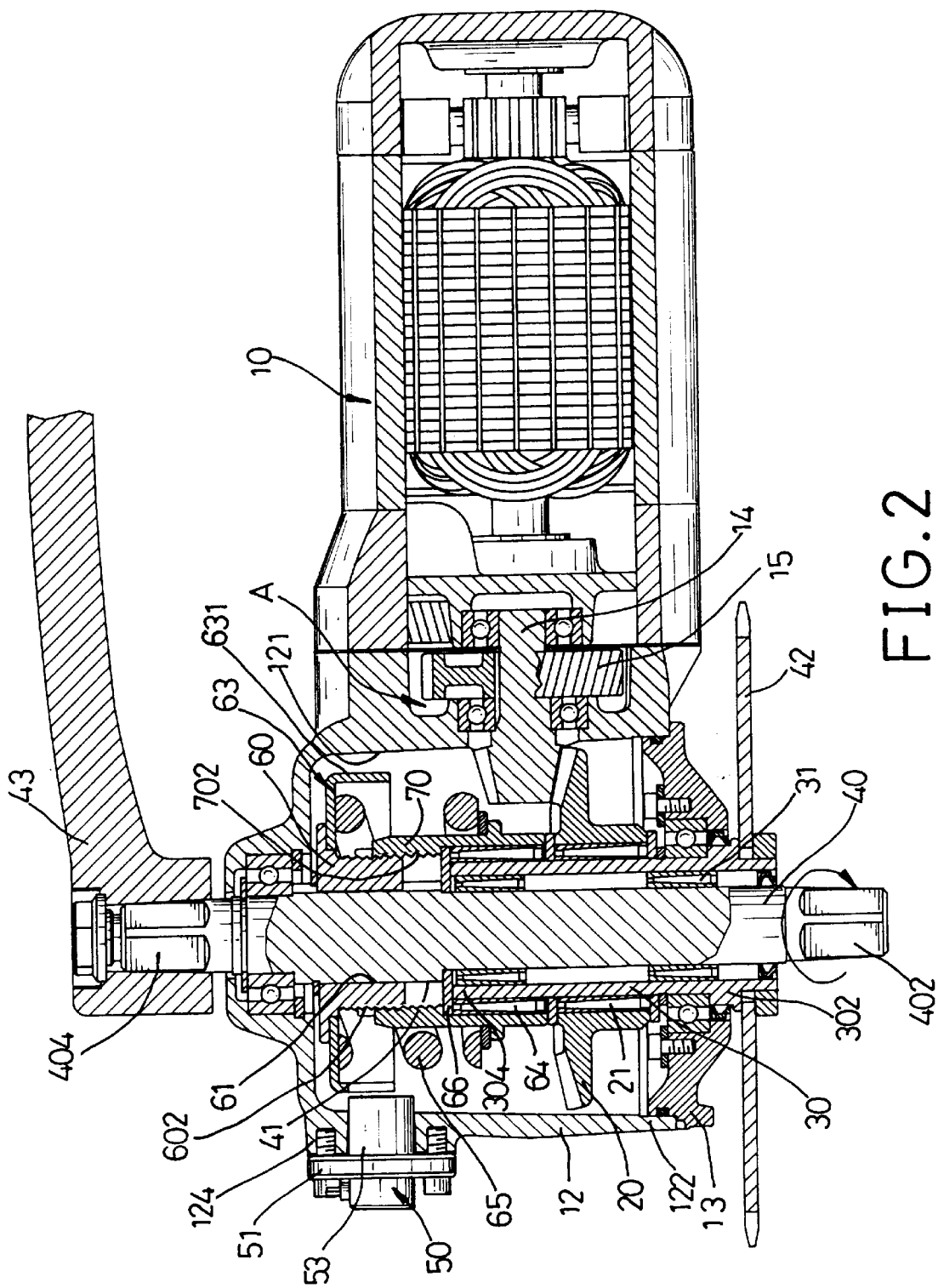
FIG. 2 is top plan cross-sectional view of an electric drive in accordance with the present invention.

Referring to the drawings, and initially to FIGS. 1 and 2, an electrical drive in accordance with the present invention is provided for a bicycle which comprises a down tube 81, a pair of chain stays 80, a crank axle 40 rotatably disposed between the down tube 81 and the pair of chain stays 80 and having a first end portion 402 and a second end portion 404, two crank arms 43 each fixedly mounted around first and second end portions 402 and 404 of the crank axle 40 respectively, a chain wheel 42 rotatably disposed on the first end portion 402 of the crank axle 40, and a drive chain 46 meshing with the chain wheel 42 to move therewith.

The electrical drive comprises a housing 12 fixedly mounted between the down tube 81 and the pair of chain stays 80 and mounted around the crank axle 40 and having a first open end portion 122 and a second end portion 124 located adjacent to the first and second end portions 402 and 404 of the crank axle 40 respectively. A chamber 121 is defined in an inner wall of the housing 12. A cap 13 is fixedly mounted on the first open end portion 122 of the housing 12.

The crank axle 40 is rotatably mounted in the chamber 121 with the first end portion 402 thereof extending outwards of the first open end portion 122 of the housing 12 and the second end portion 404 thereof extending outwards of the second end portion 124 of the housing 12.

A drive shaft 30 is mounted around the crank axle 40 and has a first end portion 302 located adjacent to the first end portion 402 of the crank axle 40 and a second end portion 304. Two needle bearings 31 are fitted between the crank axle 40 and the drive shaft 30 respectively. The chain wheel 42 is fixedly mounted around the first end portion 302 of the drive shaft 30 to rotate therewith.

A first single direction bearing 21 is fitted around the first end portion 302 of the drive shaft 30. A beveled gear 20 is mounted around the first single direction bearing 21.

A driving mechanism is mounted on the housing 12 for driving the beveled gear 20. The driving mechanism includes a gear train (A) mounted in the housing 12 and meshing with the beveled gear 20, a motor 10 fixedly attached to the housing 12 and located beneath the down tube 81 for driving the gear train (A), and a battery box 101 fixedly mounted on the down tube 81 for supplying power to the motor 10.

Figure 6:
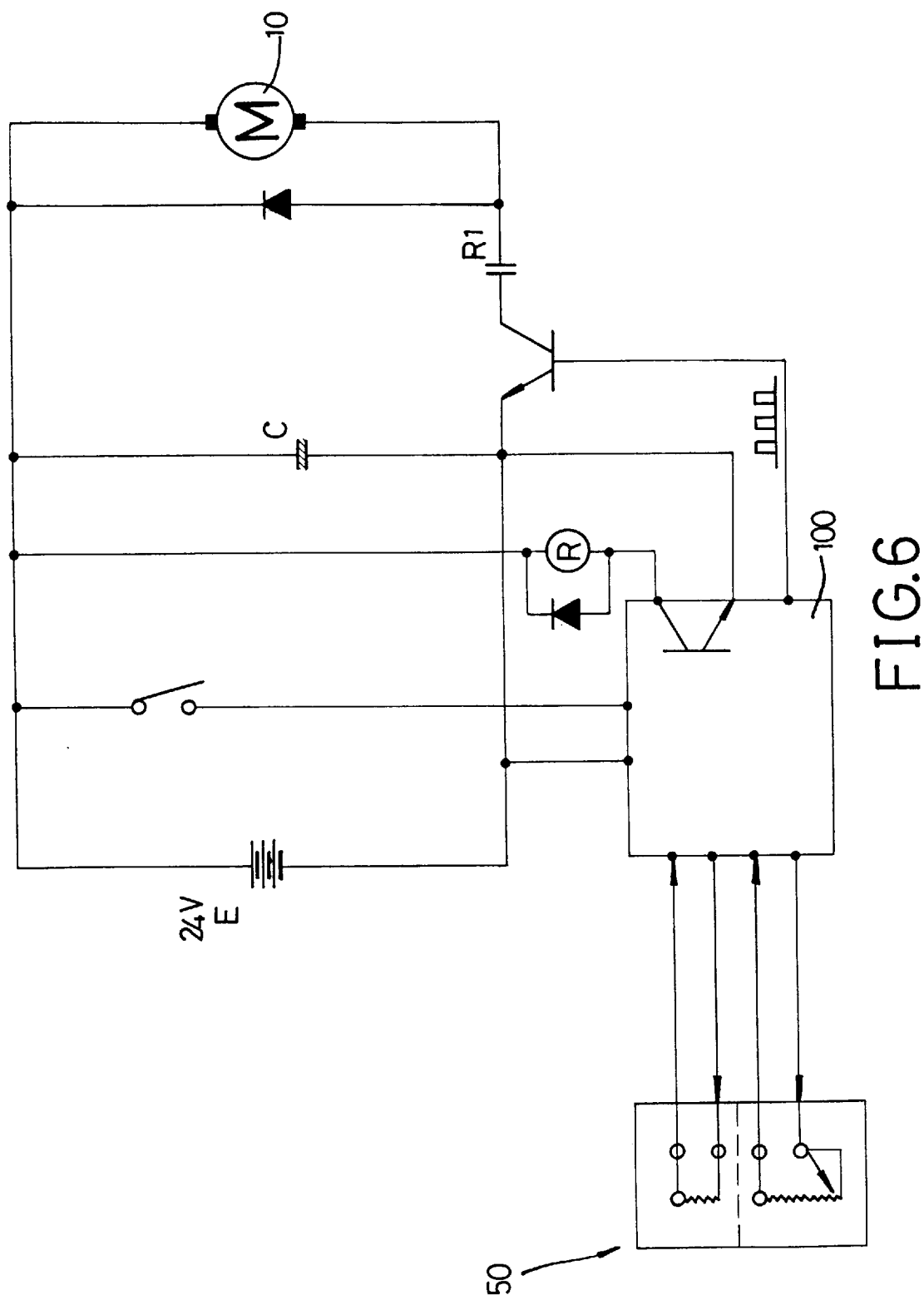
FIGS. 6 and 7 are flow charts of the electric drive.
Figure 7:
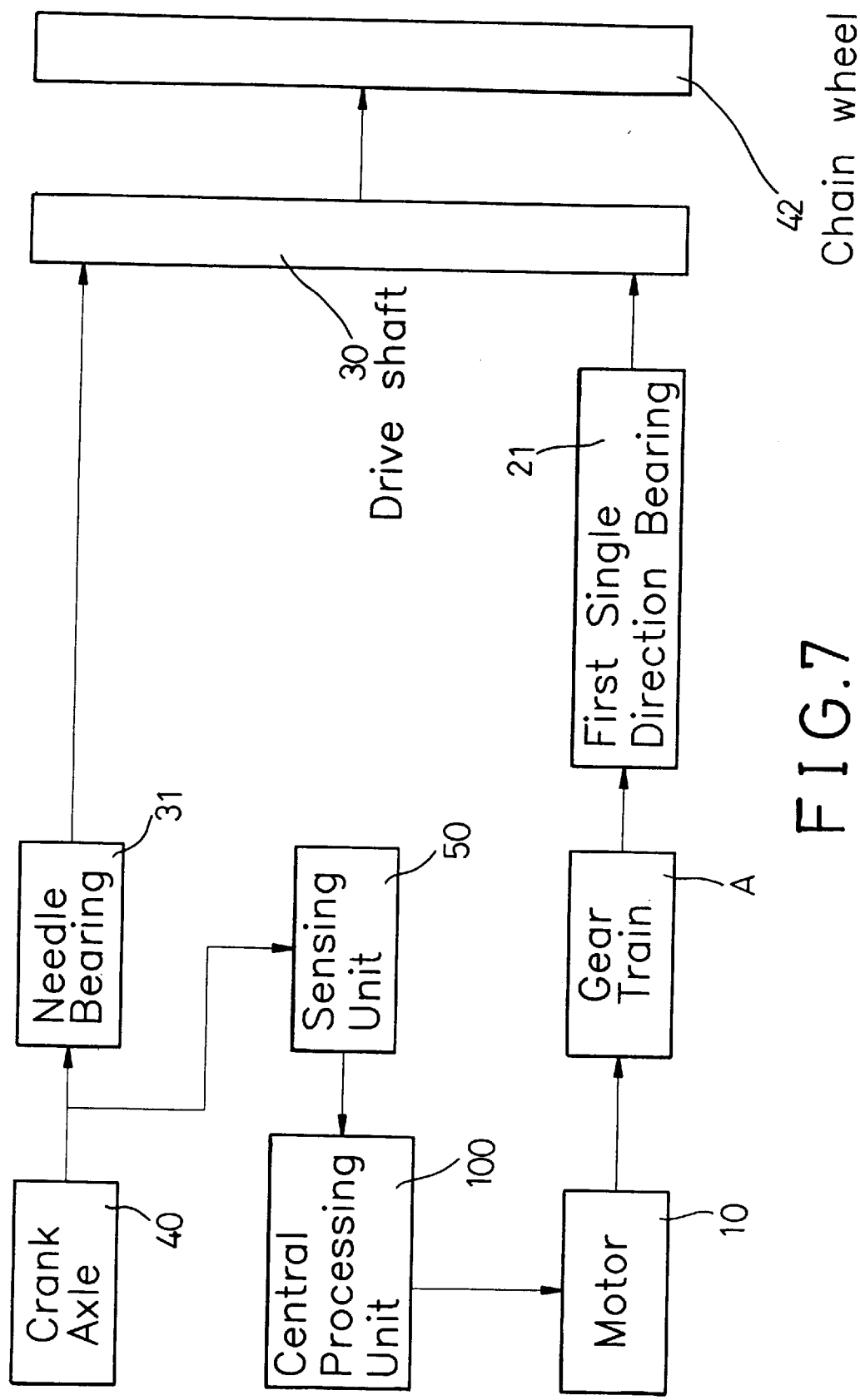

A casing 102 is mounted around the down tube 81 for containing therein a central processing unit 100 as shown in FIGS. 6 and 7.

Figure 4:
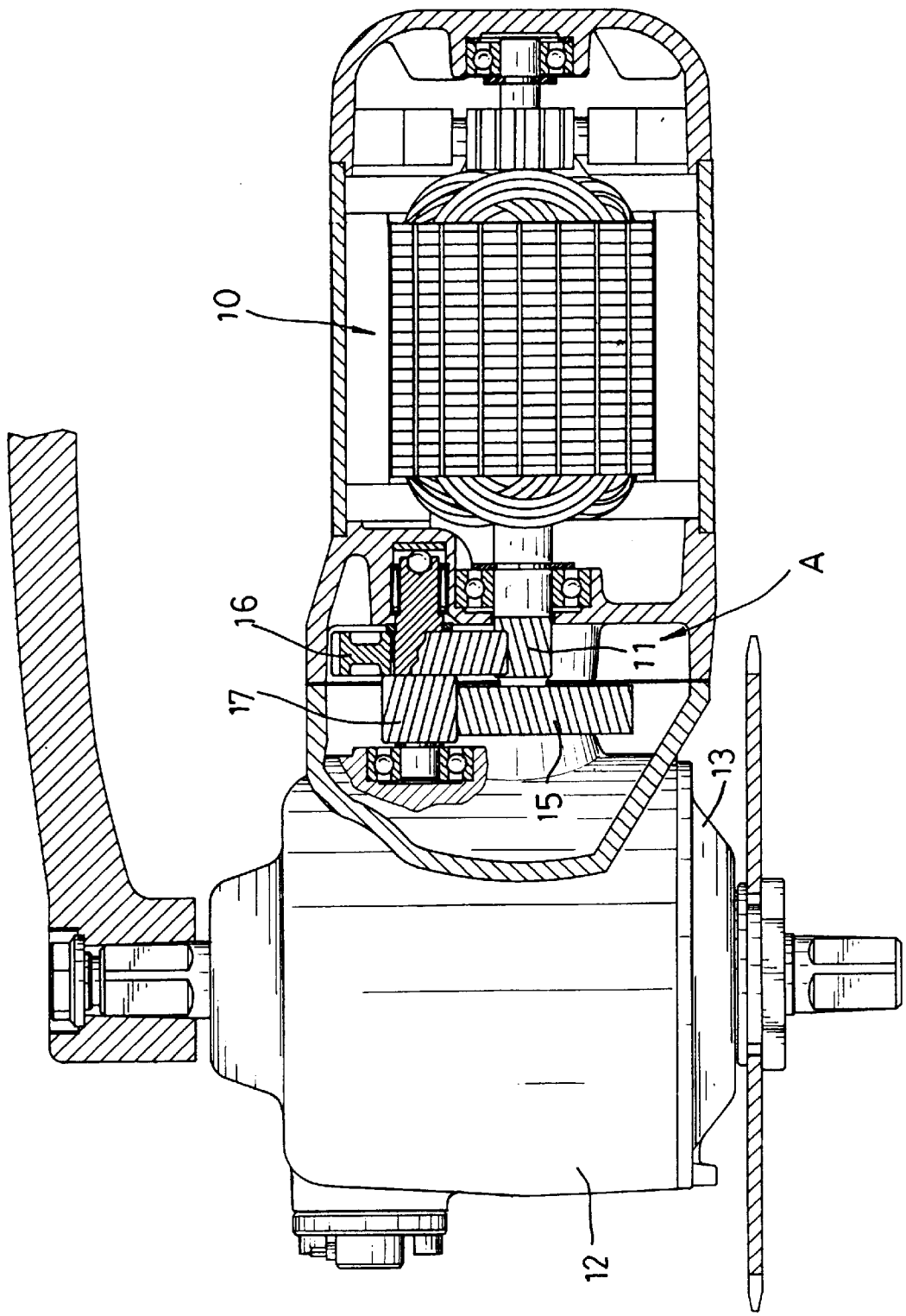
FIG. 4 is a top plan cross-sectional view showing a driving mechanism.

Preferably, specially referring to FIG. 4, the gear train (A) includes a first gear 11 driven to rotate by means of the motor 10 and meshing with a second gear 16 so as to rotate the second gear 16 which can then rotate a third gear 17 meshing with a fourth gear 15 so as to rotate the fourth gear 15 which can in turn rotate a beveled gear 14 meshing with the beveled gear 20 so as to rotate the beveled gear 20.

A second single direction bearing 64 is fitted around the second end portion 304 of the drive shaft 30. A torsional ring 70 has a first end portion mounted on the second single direction bearing 64 and a second end portion located adjacent to the second end portion 404 of the crank axle 40. A torsional rod 60 is movably mounted around the second end portion 404 of the crank axle 40 and driven by the crank axle 40 to rotate therewith and is movably mounted in the second end portion of the torsional ring 70.

Preferably, the torsional rod 60 has a plurality of splines 61 longitudinally defined in an inner wall thereof, and the crank axle 40 has a plurality of ribs 41 axially formed thereon and each fitted in an associated spline 61 respectively such that the torsional rod 60 can be fastened and moved on the crank axle 40.

In addition, the torsional ring 70 has an inner thread 702, and the torsional rod 60 has an outer thread 602 engaged in the inner thread 702. In addition, a baffle 66 is fixedly mounted in the torsional ring 70 and is located between the torsional rod 60 and the second single direction bearing 64.

Figure 5:
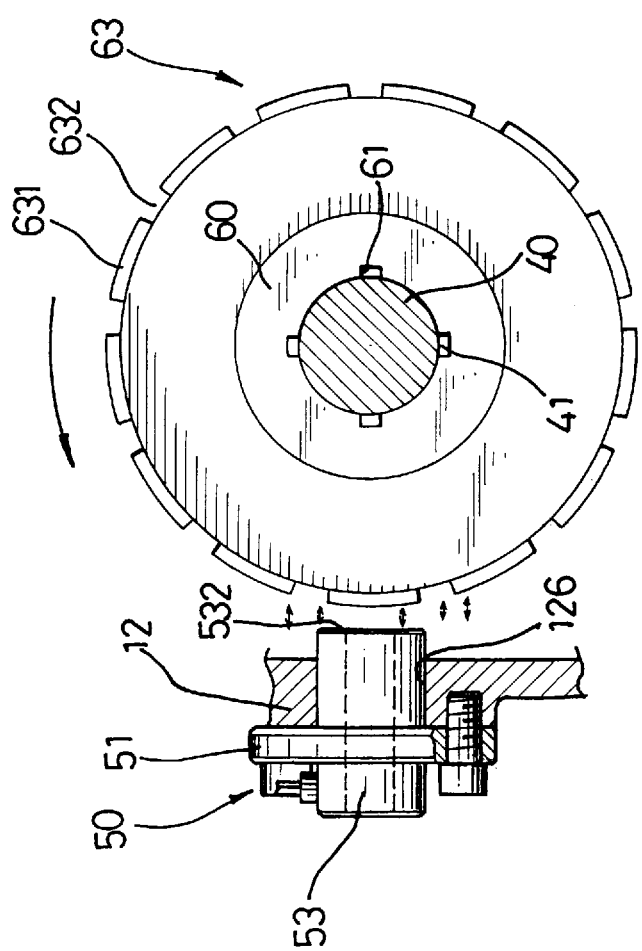
FIG. 5 is a partially front plan cross-sectional view, showing a sensing unit and a sensing race.

Referring to FIGS. 2 and 5, a sensing race 63 is fixedly mounted around the torsional rod 60. A biasing member 65 such as a spring is mounted between the sensing race 63 and the torsional ring 70.

A sensing unit 50 is mounted on the second end portion 124 of the housing 12 and is located adjacent to the sensing race 63 for sensing a rotational velocity of the crank axle 40 and a torsion exerted on the crank axle 40 by means of the sensing race 63.

Preferably, the sensing race 63 is made of a magnetic conducting metal and has a plurality of spaced extensions 631 formed on a periphery thereof. A plurality of spaces 632 are each defined between any adjacent two of the plurality of extensions 631.

In addition, the housing 12 has a hole 126 defined in the second end portion 124 thereof. The sensing unit 50 includes a sensor 53 mounted in the hole 126, and a fastener 51 securely fitted around the sensor 53 and fixedly mounted on the second end portion 124 of the housing 12 for positioning the sensor 53 in place.

In operation, referring to FIG. 2, the crank axle 40 can be rotated by means of a rider exerting a torque on the crank arms 43 so as to rotate the drive shaft 30 along a normal direction only by means of the two needle bearings 76, thereby rotating the chain wheel 42 which meshes with the drive chain 46 so as to move the bicycle forwardly.

In such a state, the beveled gear 20 and the torsional ring 70 are not rotated by the drive shaft 30 due to the first and second single direction bearings 21 and 64 idling.

In the meanwhile, the gear train (A) can be driven by means of the motor 10 to rotate the beveled gear 20 which can rotate the drive shaft 30 along the normal direction only by means of the single direction bearing 21 so as to rotate the chain wheel 50 which is driven to move the bicycle, thereby providing an assistance for moving the bicycle forwardly.

By such an arrangement, the bicycle can be driven to travel forwardly by means of physical work of the rider and by means of electrical power synchronously.

Figure 3:
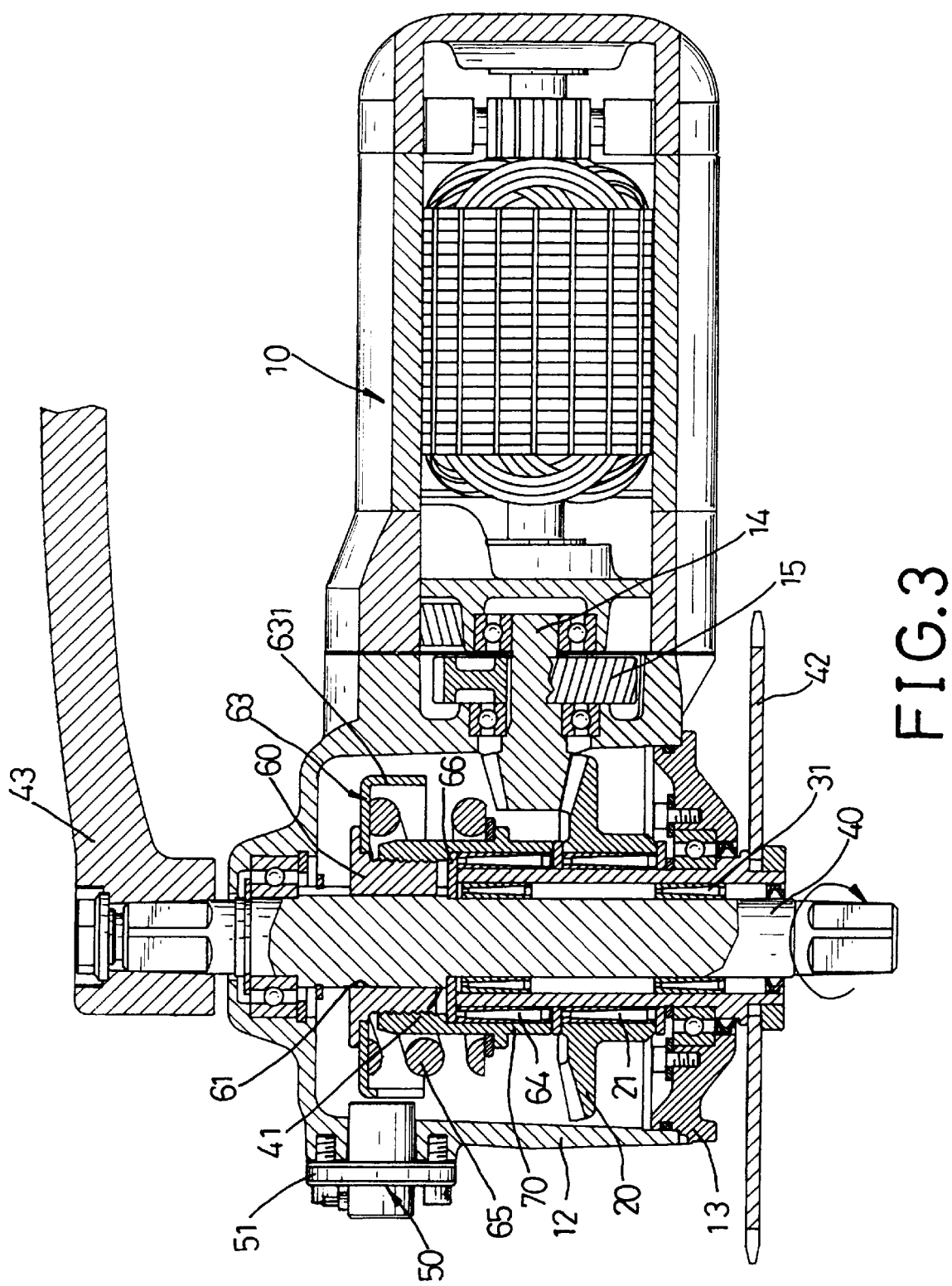
FIG. 3 is an operational view of FIG. 2.

Furthermore, referring to FIGS. 2 and 3 with reference to FIGS. 5–7, the torsional rod 60 can be rotated by the crank axle 40 and can be displaced axially on the crank axle 40 by means of a sliding engagement between the splines 61 and the ribs 41 so as to move axially in the torsional ring 70 by means of a threaded engagement between the inner thread 702 and the outer thread 602, thereby moving the sensing race 63 to a position as shown in FIG. 3.

In such a situation, the sensor 53 located beside the sensing race 63 can detect the number of the spaces 632 that pass by a sensing side 531 of the sensor 53 by means of such as eddy current action, thereby determining the rotational velocity of the crank axle 40.

At the same time, the sensor 53 can detect an axial displacement of the sensing race 63 relative to the sensor 53 and an intersecting area between the sensing side 532 and the extensions 631 that pass by the sensing side 532, thereby determining the torsion exerted on the crank axle 40 by the rider.

Then, particularly referring to FIGS. 6 and 7, the sensing unit 50 can input signals indicating rotational velocities of the crank axle 40 and signals indicating torsions exerted by the rider on the crank axle 40 into the central processing unit 100 synchronously which can perform an analytic operation so as to determine power and voltages required for the motor 10 to drive the gear train (A) by means of such as pulse width modulation (P.W.M.), thereby precisely controlling the motor 10 to rotate the drive shaft 30 by means of the gear train (A), the beveled gear 20 and the single direction bearing 21 so as to rotate the chain wheel 42, thereby providing a proper assistance for moving the bicycle.

By such an arrangement, the power supplied by the motor 10 to drive the gear train (A) can be controlled, thereby optimizing the efficiency of the supplied electricity.

In addition, the sensing unit 50 can be used to detect the rotational velocity of the crank axle 40 and the torsion exerted on the crank axle 40 synchronously.

It should be clear to those skilled in the art that further embodiments may be made without departing from the scope and spirit of the present invention.

What is claimed is:

1. An electrical drive in combination with a bicycle which comprises a down tube, a pair of chain stays, a crank axle rotatably disposed between said down tube and said pair of chain stays and having a first end portion and a second end portion, and a chain wheel rotatably disposed on the first end portion of said crank axle, said electrical drive further comprising:

a housing mounted around said crank axle and having a first end portion and a second end portion, a chamber defined in an inner wall of said housing, said crank axle being rotatably mounted in said chamber with the first end portion thereof extending outwards of the first end portion of said housing and the second end portion thereof extending outwards of the second end portion of said housing;

a drive shaft mounted around said crank axle and having a first end portion located adjacent to the first end portion of said crank axle and a second end portion, said chain wheel being fixedly mounted around the first end portion of said drive shaft;

at least one needle bearing fitted between said crank axle and said drive shaft;

a first single direction bearing fitted around the first end portion of said drive shaft;

a beveled gear mounted around said first single direction bearing;

a driving mechanism mounted on said housing for driving said beveled gear;

a second single direction bearing fitted around the second end portion of said drive shaft;

a torsional ring having a first end portion mounted on said second single direction bearing and a second end portion;

a torsional rod movably mounted around the second end portion of said crank axle and driven by said crank axle to rotate therewith and movably mounted in the second end portion of said torsional ring;

a sensing race fixedly mounted around said torsional rod; and a sensing unit mounted on the second end portion of said housing and located adjacent to said sensing race for sensing a rotational velocity of said crank axle and a torsion exerted on said crank axle.

2. The electrical drive in accordance with claim 1, wherein said driving mechanism comprises a gear train mounted in said housing and meshing with said beveled gear, a motor attached to said housing for driving said gear train, and a battery box fixedly mounted on said down tube for supplying power to said motor.

3. The electrical drive in accordance with claim 1, wherein said torsional ring has an inner thread, and said torsional rod has an outer thread engaged in said inner thread.

4. The electrical drive in accordance with claim 1, wherein said torsional rod has a plurality of splines longitudinally defined in an inner wall thereof, and said crank axle has a plurality of ribs axially formed thereon and each fitted in an associated said spline.

5. The electrical drive in accordance with claim 1, further comprising a biasing member mounted between said sensing race and said torsional ring.

6. The electrical drive in accordance with claim 1, wherein said sensing race is made of a magnetic conducting metal and has a plurality of spaced extensions formed on a periphery thereof, a plurality of spaces each defined between adjacent two of said plurality of extensions.

7. The electrical drive in accordance with claim 1, wherein said housing has a hole defined in the second end portion thereof, said sensing unit includes a sensor mounted in said hole, and a fastener mounted around said sensor and secured to the second end portion of said housing.

* * * * *